US012748122B2

(12) United States Patent
Cormier et al.

(10) Patent No.: US 12,748,122 B2
(45) Date of Patent: Sep. 29, 2026

(54) FLUIDIC NETWORK FOR POSITIVE DISPLACEMENT ASEPTIC SAMPLING

(71) Applicant: Waters Technologies Corporation, Milford, MA (US)

(72) Inventors: Sylvain Gilles Cormier, Mendon, MA (US); Michael O. Fogwill, Uxbridge, MA (US)

(73) Assignee: Waters Technologies Corporation, Milford, MA (US)

( * ) Notice: Subject to any disclaimer, the term of this patent is extended or adjusted under 35 U.S.C. 154(b) by 248 days.

(21) Appl. No.: 18/311,471

(22) Filed: May 3, 2023

(65) Prior Publication Data

US 2023/0358777 A1 Nov. 9, 2023

Related U.S. Application Data

(60) Provisional application No. 63/340,538, filed on May 11, 2022, provisional application No. 63/339,746, filed on May 9, 2022.

(51) Int. Cl.
*G01N 30/20* (2006.01)
*G01N 1/14* (2006.01)
(Continued)

(52) U.S. Cl.
CPC ........... *G01N 35/1097* (2013.01); *G01N 1/14* (2013.01); *G01N 1/20* (2013.01)

(58) Field of Classification Search
CPC ........ G01N 35/1097; G01N 1/14; G01N 1/20; G01N 30/16; G01N 2030/8813;
(Continued)

(56) References Cited

U.S. PATENT DOCUMENTS 3,393,551 A 7/1968 Todd et al.
4,942,770 A 7/1990 Seifert et al.
(Continued)

FOREIGN PATENT DOCUMENTS

CA 3090001 A1 8/2019
CN 111239297 A 6/2020
(Continued)

OTHER PUBLICATIONS

"The Mast(R) Automated Aseptic Sampling System: FAQs" Lonza, 2020.
(Continued)

*Primary Examiner* — Robert R Raevis
(74) *Attorney, Agent, or Firm* — Schmeiser Olsen, PLLC

(57) ABSTRACT

Described are a fluidic network and method for aseptic sampling from a process source. The fluidic network includes a valve that isolates the valve port that receives the process sample from all other valve ports except when the process sample flows through the valve. The fluidic network further includes a sample treatment module having a filter element and a sample preparation element to prepare the process sample for analysis. A positive displacement pump operates to draw the process sample into the fluidic network and to push a portion of the acquired process sample through the sample treatment module before dispensing the treated process sample from the fluidic network. Process sample remaining in a process sample supply line leading from the process source to the process inlet port may be pushed back to the process source via a gas flow to limit the acquired process sample volume.

23 Claims, 14 Drawing Sheets

(51) Int. Cl.
*G01N 1/20* (2006.01)
*G01N 35/10* (2006.01)

(58) Field of Classification Search
CPC .......... G01N 30/88; G01N 30/20; G01N 1/10; G01N 2001/1025; G01N 1/28; G01N 1/34; C12M 29/00; C12M 33/00
USPC ....... 73/61.56, 61.59, 64.56, 863.21–863.23, 73/864.83; 422/63, 67, 534, 535, 537, 422/608–618
See application file for complete search history.

(56) References Cited

U.S. PATENT DOCUMENTS

| | | | | |
|---|---|---|---|---|
| 6,148,657 | A | 11/2000 | Satoh et al. | |
| 8,549,934 | B2 | 10/2013 | Biksacky | |
| 9,389,151 | B2 | 7/2016 | Newbold et al. | |
| 9,442,047 | B2 | 9/2016 | Biksacky | |
| 9,499,782 | B2 | 11/2016 | Newbold et al. | |
| 10,975,349 | B2 | 4/2021 | Biksacky | |
| 2007/0072285 | A1 | 3/2007 | Barringer | |
| 2008/0308494 | A1 | 12/2008 | Barringer, Jr. | |
| 2009/0050212 | A1 | 2/2009 | Dourdeville et al. | |
| 2012/0204626 | A1* | 8/2012 | Davison | G01N 30/16 73/61.55 |

FOREIGN PATENT DOCUMENTS

| | | | |
|---|---|---|---|
| EP | 0661537 | B1 | 7/1995 |
| EP | 0892267 | A1 | 1/1999 |

OTHER PUBLICATIONS

International Preliminary Report on Patentability in PCT/US2023/020790 mailed on Nov. 21, 2024.
International Preliminary Report on Patentability in PCT/US2023/020794 mailed on Nov. 21, 2024.
Restriction Requirement in U.S. Appl. No. 18/311,462 mailed on May 8, 2025.
International Search Report and Written Opinion in PCT/US2023/020790 mailed on Aug. 17, 2023.
International Search Report and Written Opinion in PCT/US2023/020794 mailed on Sep. 15, 2023.
Non-Final Office Action in U.S. Appl. No. 18/311,462 mailed on Jul. 8, 2025.
Notice of Allowance in U.S. Appl. No. 18/311,462 mailed on Dec. 1, 2025.

* cited by examiner

FLUIDIC NETWORK FOR POSITIVE DISPLACEMENT ASEPTIC SAMPLING

RELATED APPLICATIONS

This application claims the benefit of the earlier filing date of U.S. Provisional Patent Application Ser. No. 63/339,746 filed May 9, 2022 and titled "Fluidic Network for Positive Displacement Aseptic Sampling" and claims the benefit of the earlier filing date of U.S. Provisional Patent Application Ser. No. 63/340,538 filed May 11, 2022 and titled "Fluidic Network for Positive Displacement Aseptic Sampling," the entireties of which are incorporated herein by reference.

FIELD OF THE INVENTION

The disclosed technology relates generally to a fluidic network for bioprocessing sampling applications. More particularly, the technology relates to a fluidic network and method for aseptic process sampling using a positive displacement pump.

BACKGROUND

A bioprocess may require many days for completion and sampling may be desired daily or more frequently to properly monitor and control the process. Bioprocess monitoring generally requires sample clarification to interface to analytical instrumentation. The bioprocess may be monitored for efficiency and to determine the quality of a bioprocess product. In some instances, the monitoring is used for feedback for making process adjustments.

To receive a sample from a bioprocess source, such as a bioreactor, careful procedures should be followed to protect the bioprocess source from contamination. The bioreactor may contain media that supports biological growth of one or more desired product materials. Sampling may include introducing a syringe into the reactor vessel to withdraw a desired volume of sample. This process can introduce contaminants into the reactor if the tip of the syringe was previously in contact with bio-organic material or another contaminant. As a result of the contamination, the desired output of the bioprocess may be adversely affected or terminated. For example, bacteria, viruses, mold or spores that may be unintentionally introduced into the bioreactor by the sampling process may prevent the desired bioprocess from proceeding.

Considerable time and effort are generally required to perform conventional aseptic sampling to avoid problems associated with the introduction of contaminants into the bioreactor, especially when the sampling process is not fully automated. In addition, filtration and purification are typically required prior to providing the process sample to analytical instrumentation.

Conventional bioprocess sampling techniques may acquire tens of milliliters of sample from a bioreactor to produce a clarified sample for analysis. In some applications, the volume of sample that can be acquired may be limited. For example, for small volume bioreactors such as research-scale bioreactors, milliliter sample volumes represent a substantial portion of the bioreactor volume. Consequently, the number of samples that can be acquired throughout the bioprocess may be limited thereby limiting the ability to monitor and adjust the bioprocess.

SUMMARY

In one aspect, a fluidic network for aseptic process sampling includes a sampling valve, a sample treatment module, a positive displacement pump, a selector valve and a valve control module. The sampling valve is configurable in at least a first valve state and a second valve state and includes a process inlet port to receive a process sample, a process outlet port to provide the process sample, and a plurality of valve channels. The sample treatment module includes a filtration element and a sample preparation element in fluidic communication with each other. The selector valve is disposed in a fluidic path between and in fluidic communication with the sampling valve and the sample treatment module. The selector valve is in further fluidic communication with the positive displacement pump. The selector valve is configurable in a first valve state in which the sampling valve is fluidically coupled to the positive displacement pump, a second valve state in which the positive displacement pump is fluidically coupled to the sample treatment module and a third valve state in which the sampling valve is fluidically coupled to the sample treatment module. The valve control module is in communication with the sampling valve and the selector valve and is configured to control the valve states of the two valves. A process sample path is defined between the process inlet port and the process outlet port and includes the sample treatment module and at least one valve channel of the sampling valve. When the sampling valve is in the first valve state and the selector valve is in the first valve state, a section of the process sample path upstream of the sample treatment module receives the process sample by a draw operation of the positive displacement pump. When the sampling valve is in the first valve state and the selector valve is in the second valve state, at least a portion of the process sample received in the section of the process sample path is pushed through the sample treatment module by operation of the positive displacement pump.

The fluidic network may further include an injection valve in fluidic communication with the process outlet port of the sampling valve.

The positive displacement pump may be a syringe pump.

The selector valve may include a first valve fluidically coupled to the positive displacement pump and a second valve in fluidic communication with the sampling valve, the sample treatment module and the first valve. The second valve may be configurable in a first valve state in which the sampling valve is fluidically coupled to the first valve, a second valve state in which the first valve is fluidically coupled to the sample treatment module and a third valve state in which the sampling valve is fluidically coupled to the sample treatment module.

The sample preparation element may be an affinity purification element, a size exclusion element or an ion exchange element. The filtration element may be a membrane, a syringe filter or a frit.

The sampling valve may further include a gas inlet port, wherein, when the sampling valve is in the second valve state, the gas inlet port is in fluidic communication with the process inlet port through one of the valve channels to conduct a gas flow received at the gas inlet port into a fluidic path between the process inlet port and a process source. The fluidic network may further include a gas valve in fluidic communication with the gas inlet port and a gas source, wherein the gas valve is configured to control a gas flow to the gas inlet port.

The sampling valve may further include a backflush inlet port and the fluidic network may further include a manifold configured to control the flows of a plurality of fluids and having a manifold outlet port in fluidic communication with the backflush inlet port to provide a flow of a selected one of the fluids. The manifold may include a manifold valve having a first inlet port configured to receive a gas flow, a second inlet port configured to receive a first solvent flow, and a manifold outlet port in fluidic communication with the backflush inlet port of the sampling valve, wherein the manifold valve is configurable in a first valve state in which the backflush gas flow is conducted from the first inlet port to the outlet port, a second valve state in which the first solvent flow is conducted from the second inlet port to the outlet port, and a closed valve state in which the first and second inlet ports are fluidically decoupled from the outlet port. When the manifold valve is in one of the first and second valve states, the gas flow or the first solvent flow, respectively, may flow through the sample treatment module in a reverse flow direction. The manifold valve may have a third inlet port configured to receive a second solvent flow, wherein the manifold valve is configurable in a third valve state in which the second solvent flow is conducted from the third inlet port to the outlet port. When the sampling valve is in the second valve state and the selector valve is in the third valve state, a fluidic path may be formed from the manifold valve through the backflush inlet port of the sampling valve, the sample treatment module, the selector valve, and the at least one of the valve channels of the process sample path.

The process source may be a bioreactor.

The filtration element and the sample preparation element may be integrated in a single housing.

The fluidic network may further include a solvent selector valve and a plurality of solvent sources. The solvent selector valve has a network port and a plurality of solvent ports and is in fluidic communication with the positive displacement pump through the network port. Each of the solvent sources is in fluidic communication with a respective one of the solvent ports. The solvent selector valve is configurable in a plurality of valve states each fluidically coupling one of the solvent sources to the to the positive displacement pump through the network port.

In another aspect, a method for aseptic process sampling includes drawing a process sample from a process source into a process sample path that includes at least one valve channel of a sampling valve and a sample treatment module having a filtration element and a sample preparation element. At least a portion of the process sample drawn into the process sample path is pushed path in a forward direction through the sample treatment module to an injection valve and a portion of the process sample is pushed back toward the process source.

The method may further include loading at least a portion of the process sample that was pushed to the injection valve into a sample loop.

The sample treatment module may be a single housing containing the filtration element and the sample preparation element. The sample preparation element may include one of an affinity purification element, a size exclusion element and an ion exchange element.

The method may further include providing at least one of a solvent flow and a gas flow in a reverse direction through the sample treatment module. A flow of an elution buffer may be provided in a forward direction through the sample preparation element to elute a compound of interest. A flow of a regeneration buffer may be provided through the sample preparation element.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

Figure 1A:
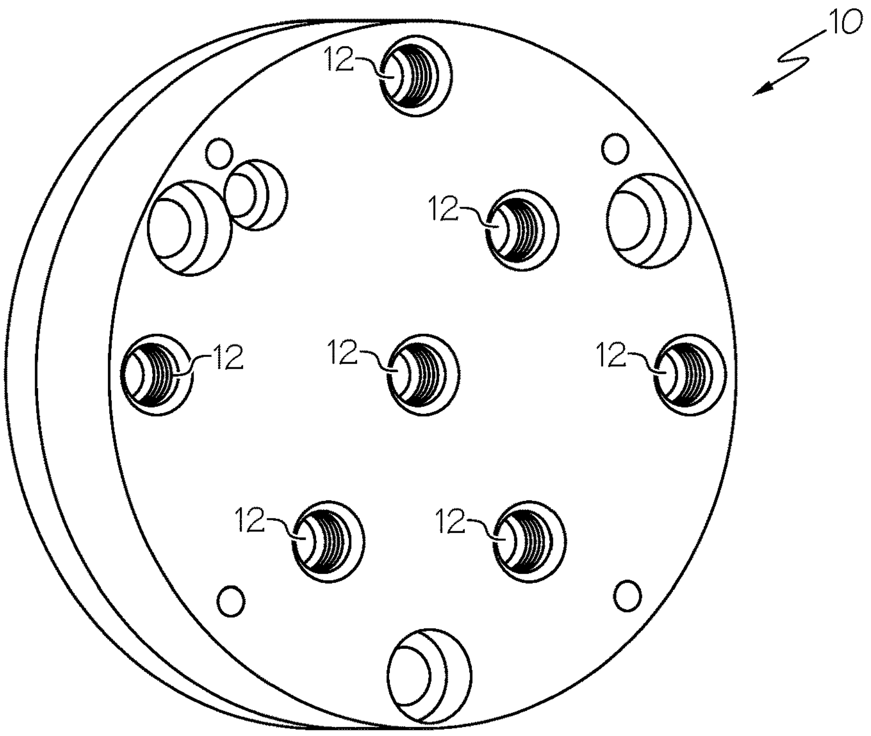
FIGS. 1A and 1B are illustrations showing a front side and a rear side, respectively, of a stator for a rotary shear seal valve that may be used as part of a fluidic network for aseptic process sampling.

Reference in the specification to an embodiment or example means that a particular feature, structure or characteristic described in connection with the embodiment or example is included in at least one embodiment or example of the teaching. References to a particular embodiment or example within the specification do not necessarily all refer to the same embodiment or example.

In brief overview, embodiments and examples disclosed herein are directed to a fluidic network that enables sample acquisition from a process source (e.g., a reactor, batch process, perfusion or flow) in an aseptic manner. The fluidic network includes a valve that isolates the valve port that receives the process sample (i.e., the "process inlet port") from all other valve ports except when the process sample flows through the valve. The fluidic network also includes a process outlet port that dispenses the process sample from the valve, for example, to flow to a system for analyzing the process sample. The fluidic network further includes a sample treatment module having a filter element and a sample preparation element to prepare the process sample for analysis. A positive displacement pump operates to draw the process sample into the fluidic network and to push a portion of the acquired process sample through the sample treatment module before dispensing the treated process sample from the fluidic network. The sample preparation element may provide a significant flow restriction. Advantageously, the location of the syringe pump in the fluidic network enables the process sample to be pushed through the sample preparation element whereas prior techniques of sample acquisition using an upstream pump or drawing through a sample manager are impractical based on the flow restriction. After dispensing the process sample from the fluidic network, a process sample path within the fluidic network is cleaned and dried before the sampling valve is reconfigured to a valve state for acquisition and treatment of another process sample. The "process sample path" refers to the fluidic path in the fluidic network through which a process sample received at the process inlet port flows before leaving the fluidic network at the process outlet port. Thus, the process inlet port is never connected to an unsanitized valve channel, thereby substantially reducing or eliminating the probability of introducing contamination into the reactor. Additionally, process sample remaining in a process sample supply line leading from the process source to the process inlet port may be pushed back to the process source via a gas flow. This return of process sample to the process source further limits the full volume of process sample extracted from the process source and enables the separation between the process source and the fluidic network to be increased for convenience.

As part of the cleaning process, valve channels and other components in the process sample path, such as the sample treatment module, are dried and backwashed. One or more solvents and one or more gases may be used and the sequence and durations of solvent and gas flows may vary. Advantageously, the ability to draw small volume process samples (e.g., a few hundred microliters or less) prevents loss of significant product generated by the bioprocess during process monitoring. This ability to acquire small volumes of process samples makes the fluidic network particularly suitable for small volume bioreactors. In addition, the lifetimes of the elements in the sample treatment module are increased with a corresponding reduction in maintenance time and costs.

The present teaching will now be described in detail with reference to exemplary embodiments or examples thereof as shown in the accompanying drawings. While the present teaching is described in conjunction with various embodiments and examples, it is not intended that the present teaching be limited to such embodiments and examples. On the contrary, the present teaching encompasses various alternatives, modifications, and equivalents, as will be appreciated by those of skill in the art. Those of ordinary skill having access to the teaching herein will recognize additional implementations, modifications, and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not put a limitation on the scope of the embodiments. No language in the specification should be construed as indicating any unclaimed element as essential to the practice of the embodiments.

Figure 1B:
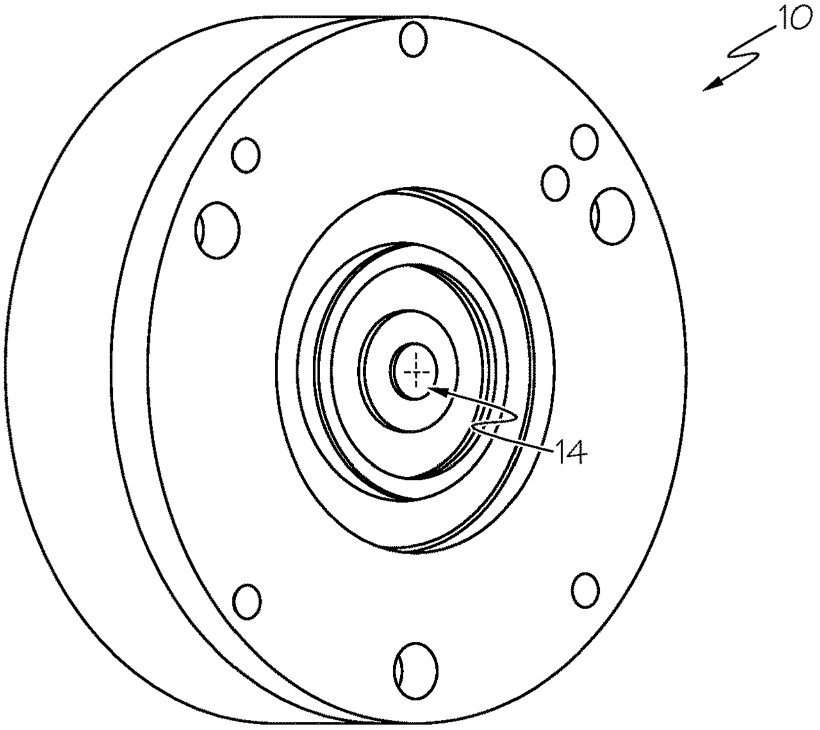

FIGS. 1A and 1B are illustrations showing a front side and a rear side, respectively, of a stator 10 for a rotary shear seal valve that may be used as part of a fluidic network for aseptic process sampling. The stator 10 includes eight external ports 12 that may be used to receive or discharge fluid flows. Each external port 12 is connected via an internal fluidic channel to a corresponding one of eight stator ports on the stator surface 14 which abuts the rotor surface (not shown) in the assembled valve. In one implementation, the stator is formed using a diffusion bonding process that enables efficient routing of the internal fluidic channels between the external ports 12 and the stator ports on the stator surface 14. Tubing may be coupled to an external port 12 using a compression fitting so that a fluid flow passes into or out from the valve. In the examples of a fluidic network described below, one of the external ports 12 receives a process sample flow. Other external ports 12 may be used to pass the process sample flow to, or receive the process sample flow from, other components of the fluidic network (e.g., a filter, a sample preparation device or both) and external systems such as a process sampler module of an analytical system (e.g., a liquid chromatography system). The external ports 12 that pass the process sample flow are determined by internal valve channel configurations established by the valve state of the valve.

Figure 11:
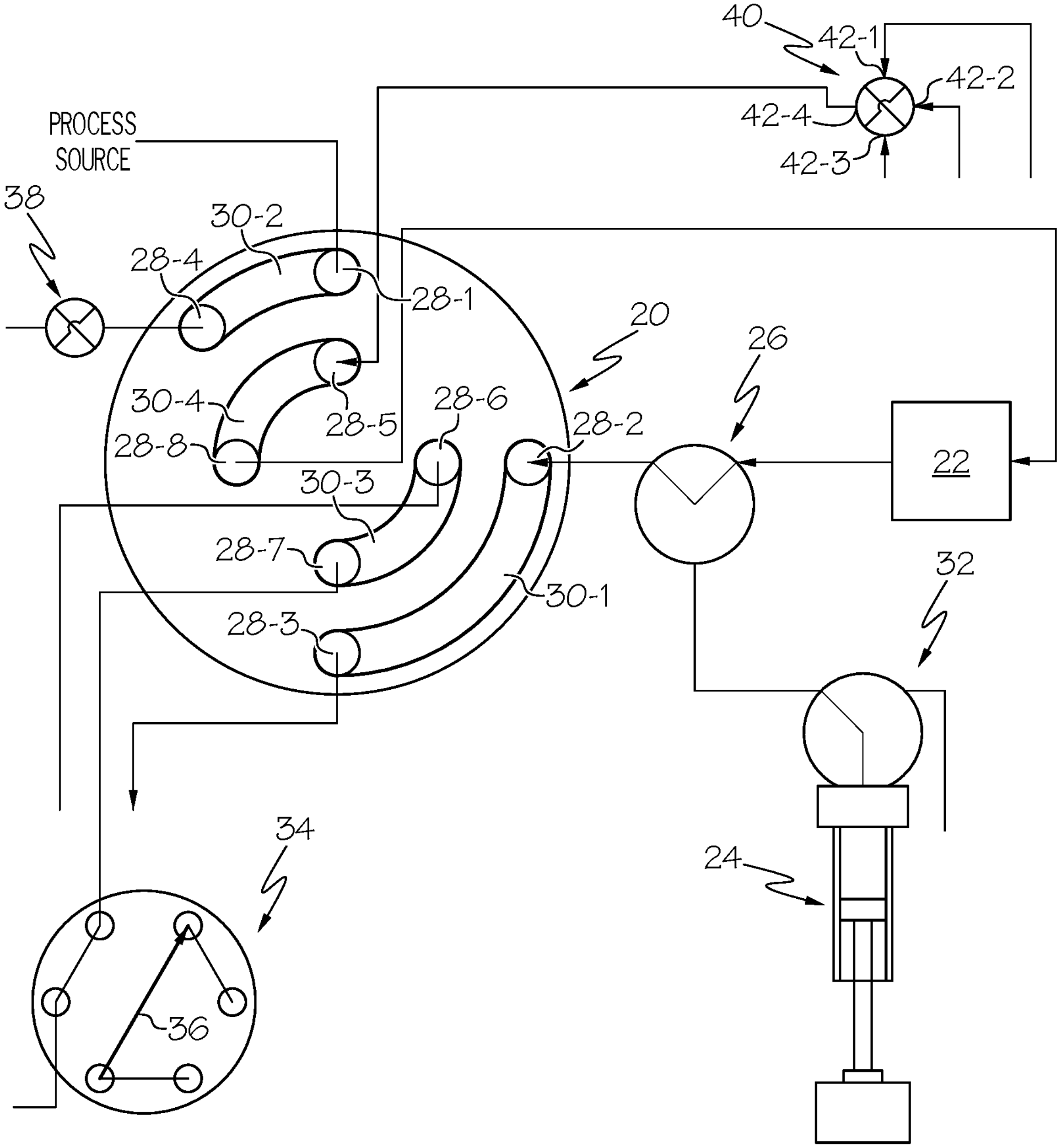
FIG. 11 shows the fluidic network of FIG. 10 with the manifold valve switched to its third valve state to provide a second solvent through the process sample path.
Figure 12:
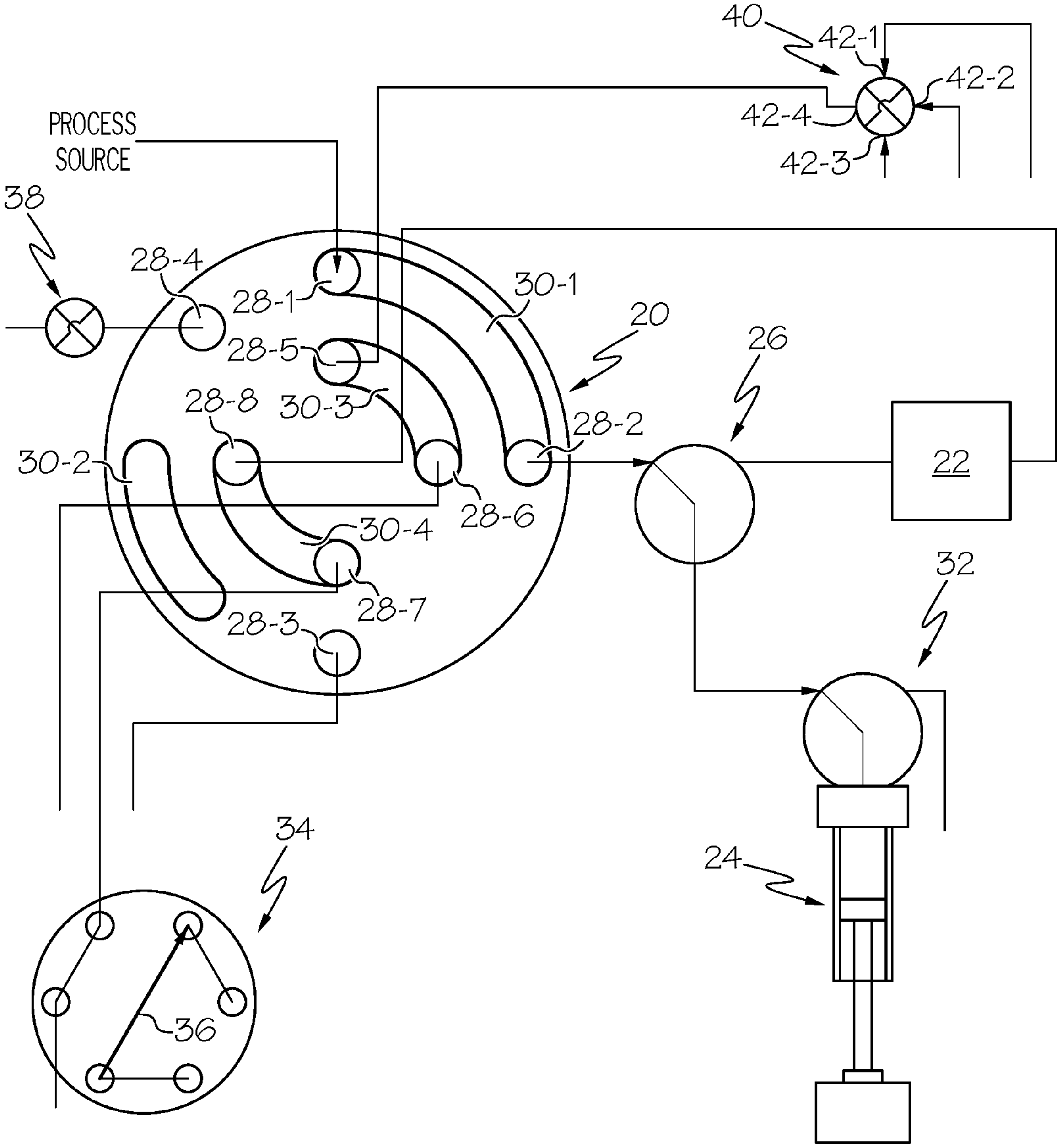
FIG. 12 shows the fluidic network of FIG. 11 with the sampling valve switched to its first valve state and the metering pump switched to its first valve state in preparation for acquiring another process sample.
Figure 13:
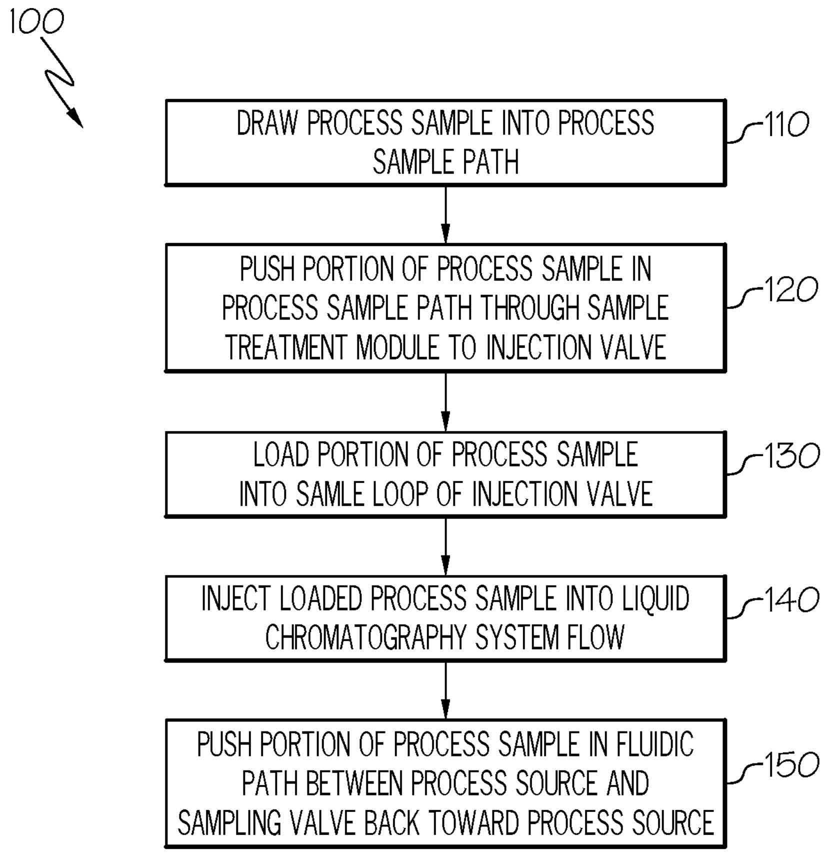
FIG. 13 is a flowchart representation of an example of a method for aseptic process sampling using the fluidic network shown in FIGS. 2 to 12.

FIGS. 2 to 12 are schematic illustrations of an example of a fluidic network that may be used for aseptic sampling. The fluidic network includes a plurality of valves and the different illustrations show the valves configured in corresponding valve states to achieve the desired functionality for aseptic process sampling. For example, the fluidic network may be used to sample an ongoing bioprocess in a bioreactor. Reference is also made to FIG. 13 which is a flowchart representation of an example of a method 100 for aseptic process sampling that may be practiced using the fluidic network. Sampling may occur in a repeated manner over a range of time to enable monitoring of a process from initiation to completion.

The fluidic network includes a sampling valve 20, a sample treatment module 22, a positive displacement pump 24, a selector valve 26 and a valve control module (not shown). In the illustrated example, the sampling valve 20 is a rotary shear seal valve that includes a rotor having a rotor surface and a stator having a stator surface that abuts the rotor surface. In alternative implementations, the sampling valve 20 may be a linear shear seal valve or other valve arranged to provide similar functionality. The stator includes multiple stator ports 28-1 to 28-8 (generally 28) on the stator surface. Stator channels that pass through the body of the stator fluidically couple external valve ports to respective stator ports 28. Tubing may be coupled to an external port, for example, using a compression fitting, so that a fluid flow passes into or out from the corresponding stator channel and stator port 28. The rotor includes a plurality of valve channels 30-1 to 30-4 (generally 30). As illustrated, the valve channels 30 are curved microchannels formed as grooves on the rotor surface. Each valve channel 30 provides a flow path that may be used to fluidically couple two of the stator ports 28 according to a configuration of the valve 20 in one of the valve states.

Figure 2:
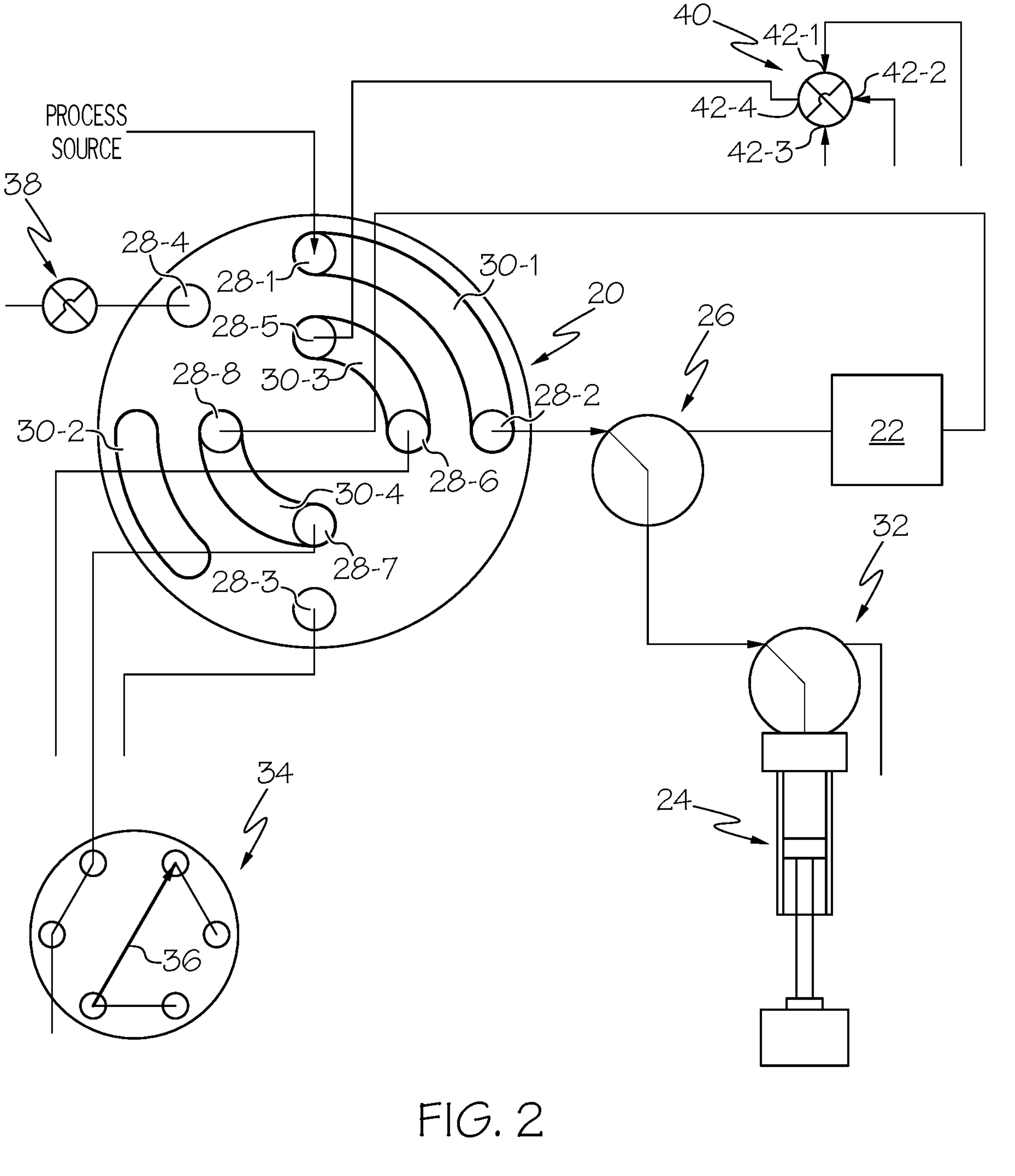
FIG. 2 is a schematic illustration of an example of a fluidic network configured to acquire a process sample from a process source.
Figure 7:
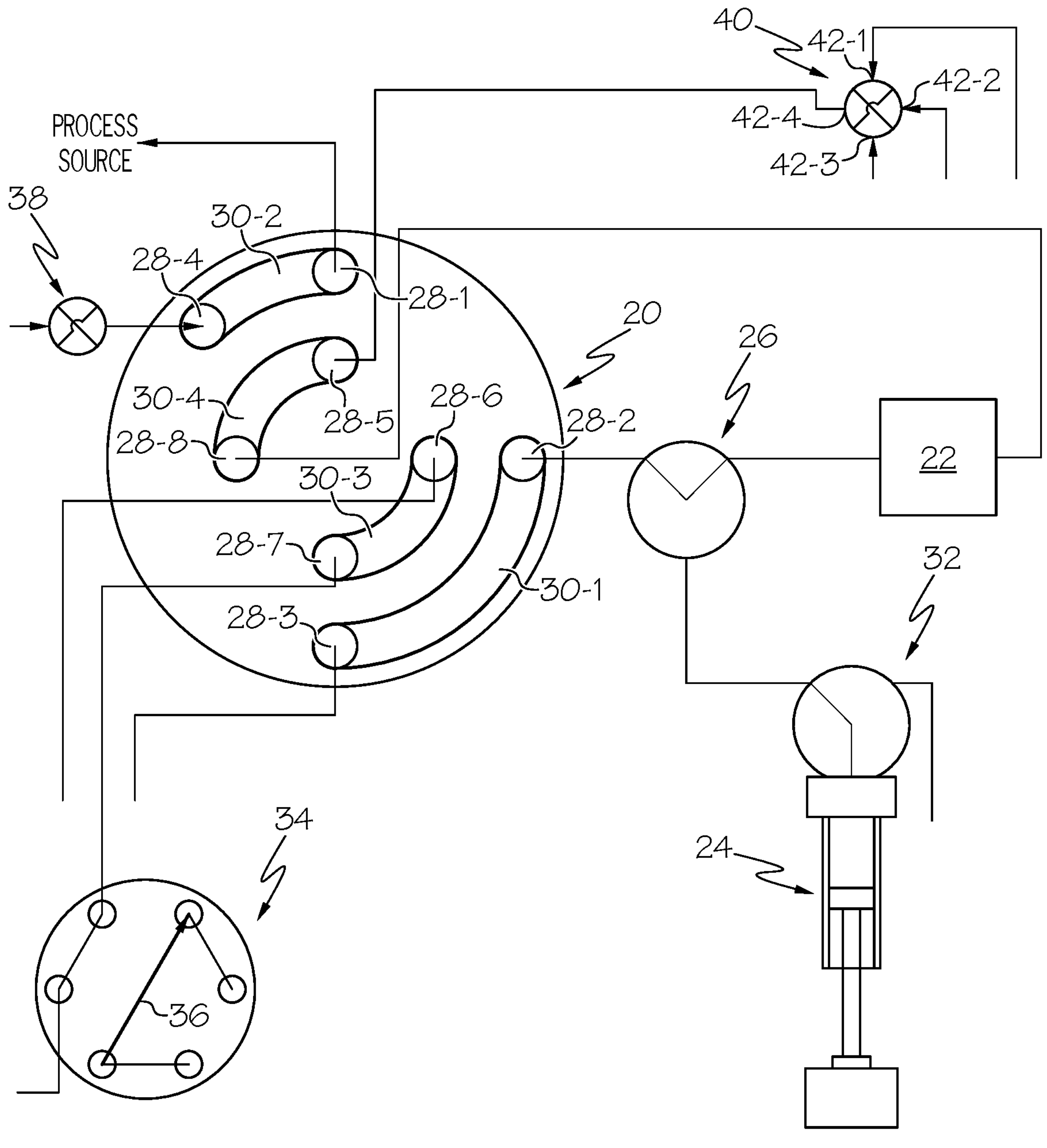
FIG. 7 shows the fluidic network of FIG. 6 optionally reconfigured to allow a portion of the process sample in the fluidic path extending from the process source to be pushed back toward the process source.

The sampling valve 20 can switch between valve states by rotating from a first valve state, as shown in FIG. 2, to a second valve state, as shown in FIG. 7, by clockwise rotation of the rotor by 90° with respect to the stator. Conversely, the sampling valve 20 can change from the second valve state to the first valve state by counterclockwise rotation of the rotor by 90° with respect to the stator.

The sample treatment module 22 includes a filtration element in serial fluidic communication with a sample preparation element. In use, the process sample first flows through the filtration element which removes large particles and cellular clumps from the flow to yield a clarified process sample. By way of non-limiting examples, the filtration element may be one or more of a membrane, syringe filter, frit or similar component. The clarified sample may include express proteins, dead cells, cytoplasm and other in-solution constituents. The sample preparation element receives the clarified process sample from the filtration element and isolates one or more desired target compounds for subsequent processing or analysis. By way of non-limiting examples, the sample preparation element can be a size exclusion column, an ion exchange column or an affinity purification column. For example, the desired target compound may be a therapeutic protein of interest such as an antibody. A sample preparation element in the form of an affinity purification column can include a ligand having a high affinity for antibodies. As the clarified process sample flows through the column (at neutral pH), the antibodies are retained while the remainder of the flow passes through the column and is directed to waste. Subsequently, an elution buffer can be provided through the column to cause the antibodies to release and flow from the element. For example, the elution buffer may have a low pH or other characteristic that favors elution of the antibodies. The elution buffer may flow through the column in a forward direction. The antibodies released from the column can be provided to an analytical instrument, such as a liquid chromatography system, for analysis.

In a preferred implementation, the sample treatment module 22 is provided as a housing which contains both the filtration element and the sample preparation element. In one example, the module 22 may be a disposable cartridge. In some embodiments, the module 22 can be regenerated between uses and may be used multiple times before requiring replacement. The ability to provide a reverse solvent flow through the module 22, as described in more detail below, enables several uses before requiring replacement.

The positive displacement pump 24 is coupled within the fluidic network through a metering valve 32. The metering valve 32 may be a rotary shear seal valve, a linear shear seal valve or other type of valve adapted to achieve switching between valve states to achieve the desired fluidic routing. In preferred examples, including the examples described herein, the positive displacement pump 24 is a syringe pump although in other implementations a different form of positive displacement pump may be used. Throughout the figures, the metering valve 32 is shown configured in a first valve state in which the syringe pump 24 is fluidically coupled to the selector valve 26; however, the metering valve 32 may be configured in a second valve state in which the syringe pump 24 is effectively decoupled from the remainder of the fluidic network and is instead coupled to a waste channel or a channel that may be used to aspirate a solvent from a solvent source (not shown), as described below with respect to an alternative implementation shown in FIG. 4. In alternative examples of the illustrated fluidic network, the selector valve 26 and metering valve 32 may be implemented in a single valve that performs the fluid path reconfigurations achieved by the combination of the two valves 26 and 32.

Figure 3:
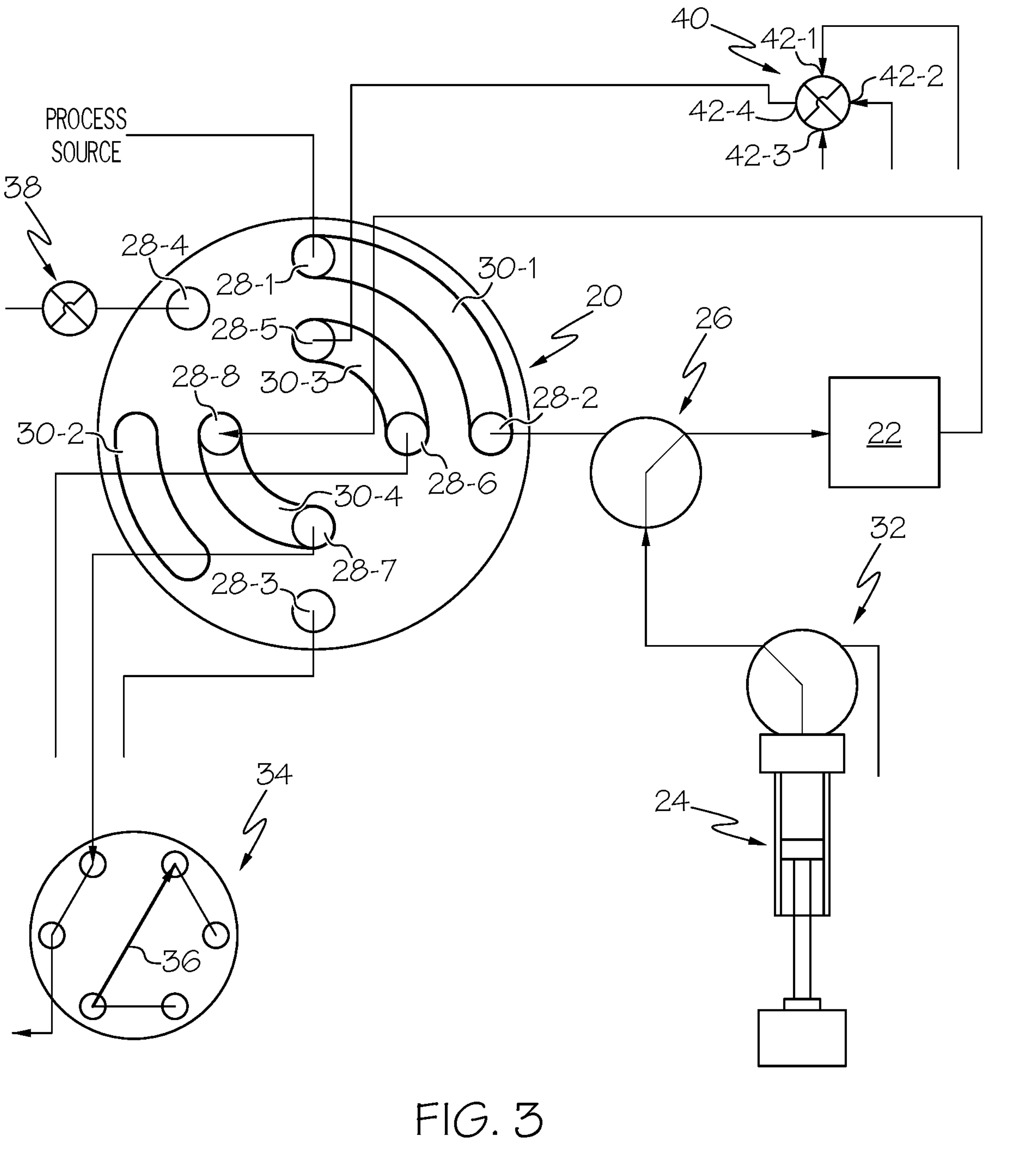
FIG. 3 shows the fluidic network of FIG. 2 with a selector valve switched to a second valve state.

The selector valve 26 includes three ports and is operable in at least three valve states. In a first valve state, as shown in FIG. 2, the selector valve 26 fluidically couples stator port 28-2 of the sampling valve 20 to the syringe pump 24 through the metering valve 32. In a second valve state, as shown in FIG. 3, the selector valve 26 fluidically couples the syringe pump 24 through the metering valve 32 to the sample treatment module 22. In a third valve state, as shown in FIG. 7, the selector valve 26 fluidically couples stator port 28-2 to the sample treatment module 22.

The valve control module communicates with the sampling valve 20 and the selector valve 26 and can configure these valves in their different valve states. In some embodiments, the valve control module is used to control additional valves in the fluidic network. For example, the illustrated fluidic network also includes a gas valve 38 in fluidic communication with the sampling valve 20 through a gas inlet port 28-4. The gas valve 38 may be controlled by the valve module. By way of example, the valve control module may be implemented using a standalone processor or as part of system processor. The valve control module may interface with a system controller and may be programmable via a user interface that also enables an operator to control other system parameters and functions, such as operation of a process sample source (e.g., a bioreactor) and/or an analytical instrument (e.g., a liquid chromatography system).

In some implementations, the fluid network further includes a manifold that supplies and controls a plurality of fluid flows. In the illustrated example, the manifold includes a manifold valve 40 having a first inlet port 42-1 to receive a gas flow from a gas source, a second inlet port 42-2 to receive a first solvent flow, and a third inlet port 42-3 to receive a second solvent flow. For example, the inlet ports 42-1 to 42-3 may be configured as external ports that are coupled using compression fittings and tubing to sources of gas and solvent. The manifold valve 40 has a manifold outlet port 42-4 to provide either the gas flow or one of the solvent flows. The manifold outlet port 42-4 is in fluidic communication with a backflush inlet port (stator port 28-5) on the sampling valve 20. The manifold outlet port 42-4 may be coupled to the sampling valve 20 with a compression fitting and tubing to provide the gas or solvent flow. By way of non-limiting examples, the manifold valve 40 may be a solenoid valve, a rotary shear seal valve or a linear shear seal valve. In non-limiting alternative examples, the manifold may be implemented as a passive fluidic tee coupled to fluid source lines each having an independent flow control device and/or a pressure regulator.

In the following description, reference is made to a sequence of figures showing valves in different valve states to enable aseptic process sampling according to one example. Although described in a specific sequence, it should be recognized that some of the steps in the sequence may be reordered or omitted according to other examples.

Reference is again made to FIG. 2, which shows the fluidic network configured to acquire a process sample from a process source and to the example of a method 100 for aseptic process sampling depicted in FIG. 13. The sampling valve 20, selector valve 26 and metering valve 32 are each operated in their first valve state such that a continuous fluidic path is defined from the process source through to the syringe pump 24. The syringe pump 24 is operated to draw (aspirate) (step 110) fluid such that a process sample from the process source is drawn through valve channel 30-1 and through the selector valve 26 toward the metering valve 32 such that the process sample is received in a section of the process sample path upstream of the sample treatment module 22. Operation of the syringe pump 24 may be controlled so that a known volume of process sample is acquired.

Referring to FIG. 3, the selector valve 26 is switched to its second valve state so that the syringe pump 24 is in fluidic communication with the sample treatment module 22. The syringe pump 24 is operated to push (step 120) at least a portion of the process sample received in the section of the process sample path in a forward direction through the sample treatment module 22. That is, pushed process sample flows from the selector valve 26 through the module 22 to stator port 28-8. However, reverse flows of gas and solvent, that is, from right to left in the figure through the sample treatment module 22, as described further below, are used to remove particulate matter and cellular clumps captured by the filtration element or residing in the sample preparation element to waste. An additional flow comprising a regeneration buffer may be used to regenerate the sample preparation element so that the module 22 is ready for a subsequent process sample. Thus, the process sample that exits the module 22 and is received at the sampling valve 20 at stator port 28-8 is clarified and prepared by the filter and sample preparation elements, respectively.

Figure 4:
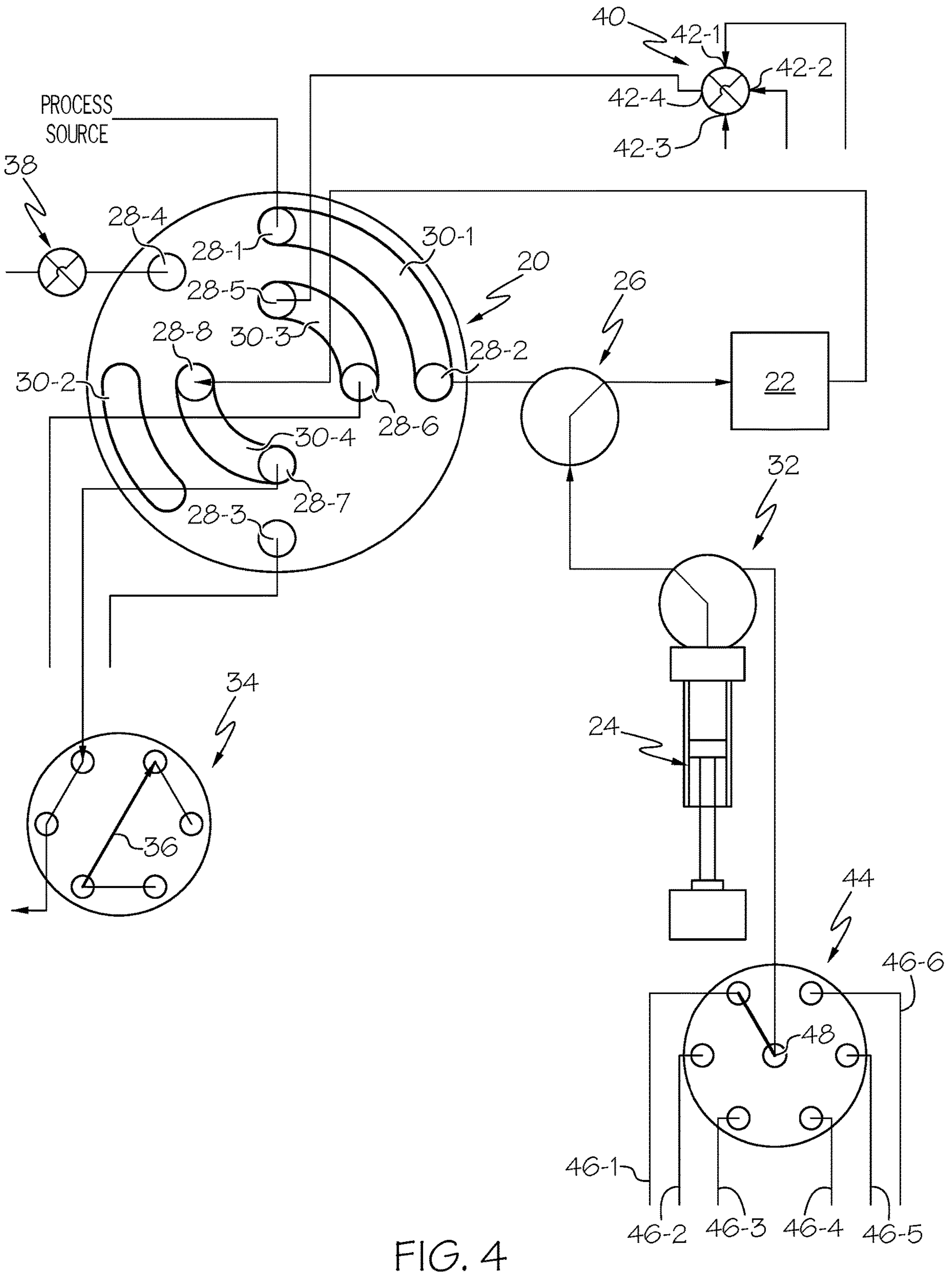
FIG. 4 is an alternative implementation to the fluidic network shown in FIG. 3 and includes an additional valve to enable a selected solvent to be provided from multiple solvent sources.

In various embodiments, a solvent is supplied to the sample preparation element to provide the process sample in the form of one or more target compounds eluted from the sample preparation element. As illustrated, the solvent supplied by the syringe pump 24 can be used to elute target compounds retained by the sample preparation element. In an alternative implementation, the fluidic network may be modified as shown in FIG. 4. This modified configuration includes an additional valve (solvent selector valve 44) that enables the positive displacement pump (syringe pump 24) to draw a solvent from a solvent source (not shown) fluidically coupled through one of the fluidic lines 46-1 to 46-6 (generally 46) to the valve 44. The drawn solvent can be discharged through a network port 48 toward the metering valve 32.

The illustrated solvent selector valve 44 can accommodate up to six solvent sources; however, the number of solvent sources may be less, for example, if one or more of the fluidic lines 46 is a waste channel. One advantage of the solvent selector valve 44 is the ability to select a solvent with the desired elution properties for a particular process sampling application. For example, the solvent may be selected based on the properties of the sample preparation element and target compounds. It will be appreciated that solvent selector valves having different configurations (e.g., different numbers of ports and fluidic lines 46) may be used.

Figure 5:
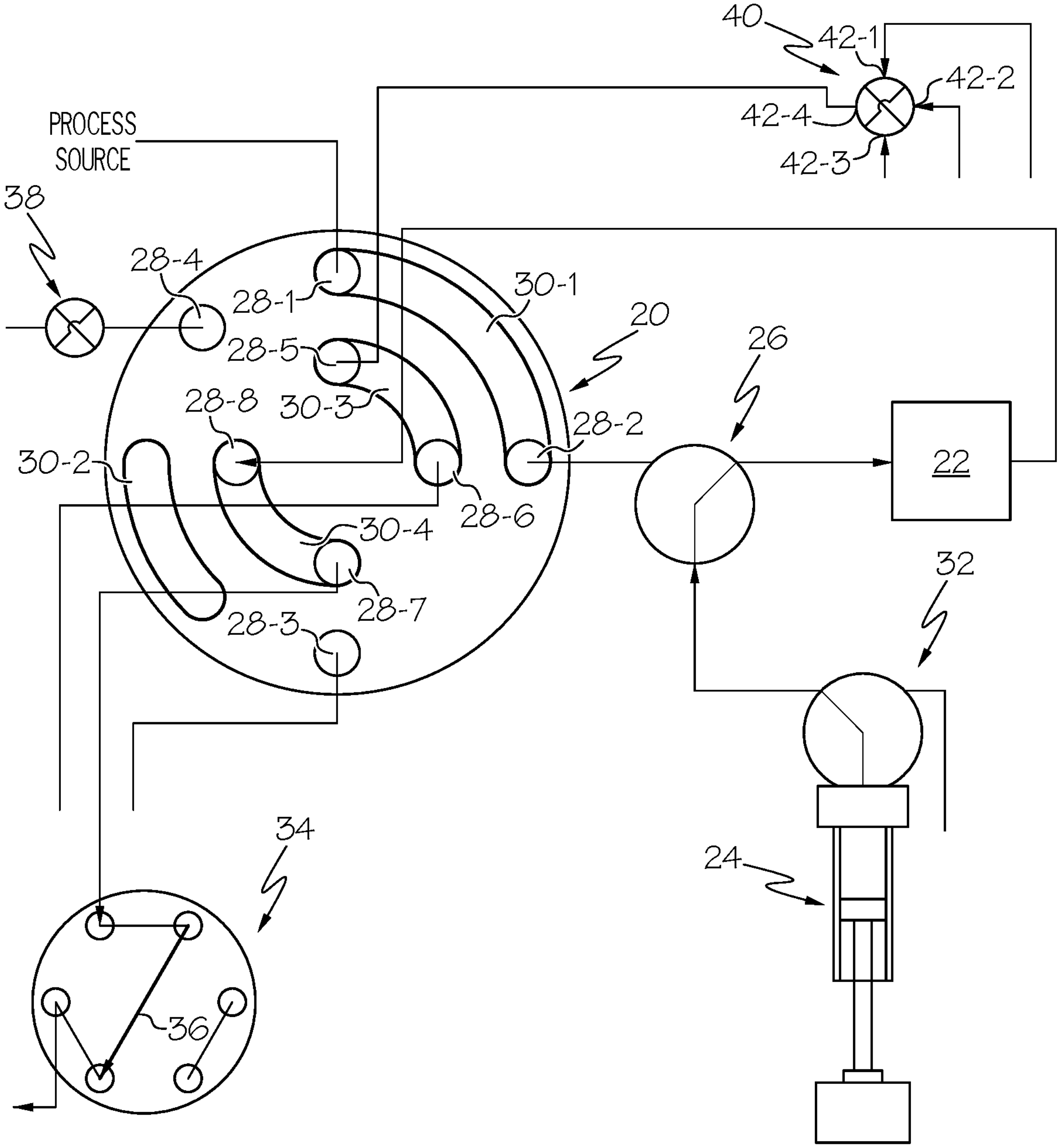
FIG. 5 shows the fluidic network of FIG. 3 with an injection valve switched to a valve state for loading of the process sample from the fluidic network into a sample loop.
Figure 6:
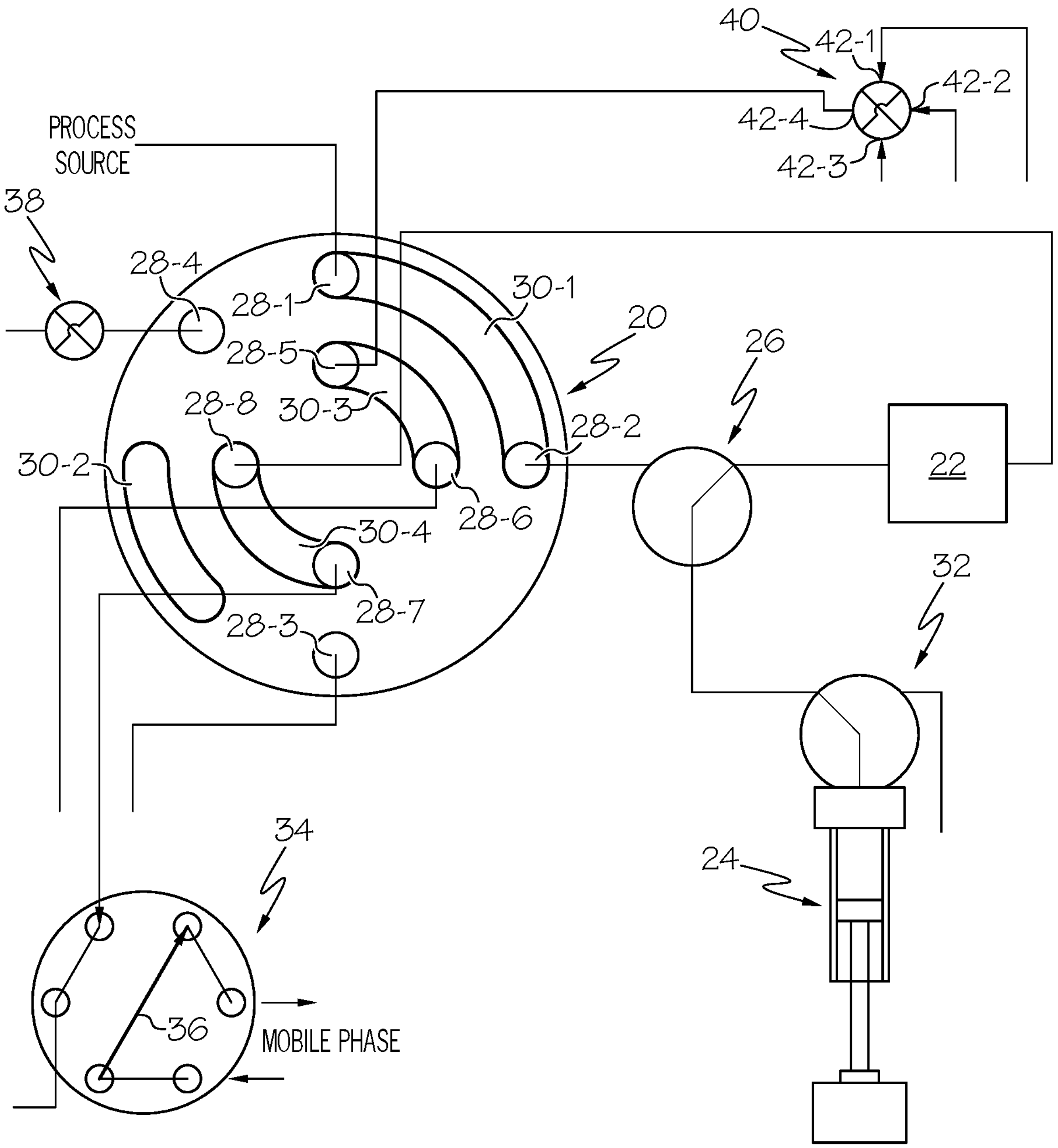
FIG. 6 shows the fluidic network according to FIG. 5 with the injection valve switched to a different valve state to inject the process sample in the sample loop into a liquid chromatography system flow.

Referring again to FIG. 3, the process sample flows from process outlet port (stator port 28-7) to an injection valve 34 of a liquid chromatography system. FIG. 4 shows the injection valve 34 switched to a valve state to enable the process sample to be loaded (step 130) into a sample loop 36 to await injection into a mobile phase of the liquid chromatography system. FIG. 5 shows the injection valve 34 switched to a different valve state to inject (step 140) the process sample in the sample loop 36 into the liquid chromatography system flow.

The fluidic network is shown in FIG. 7 optionally configured to allow process sample in a fluidic path from the process source to the process inlet port (stator port 28-1) of the sampling valve 20 to be pushed back (step 150) toward and into the process source. The network is configured similar to FIG. 6 except that the sampling valve 20 is operated in its second valve state. The gas valve 38 controls the flow of a gas from a gas source to stator port 28-4 where the gas flow continues through valve channel 30-2 and out through stator port 28-1 toward the process source. By way of non-limiting examples, the gas may be nitrogen, another non-reactive gas or oxygen. Thus, any process sample in the fluidic path extending from stator port 28-1 back through the corresponding stator channel, corresponding external port 12 and the fluidic path (process tube) to the process source may be partially or fully emptied back into the process source. This backflush of gas into the process tube reduces the total volume of process sample removed from the process source. Thus, for a bioreactor process source, this gas backflush preserves more of the end product of the bioreaction and/or enables more frequent sample acquisition to better monitor and control the bioreaction.

Figure 14:
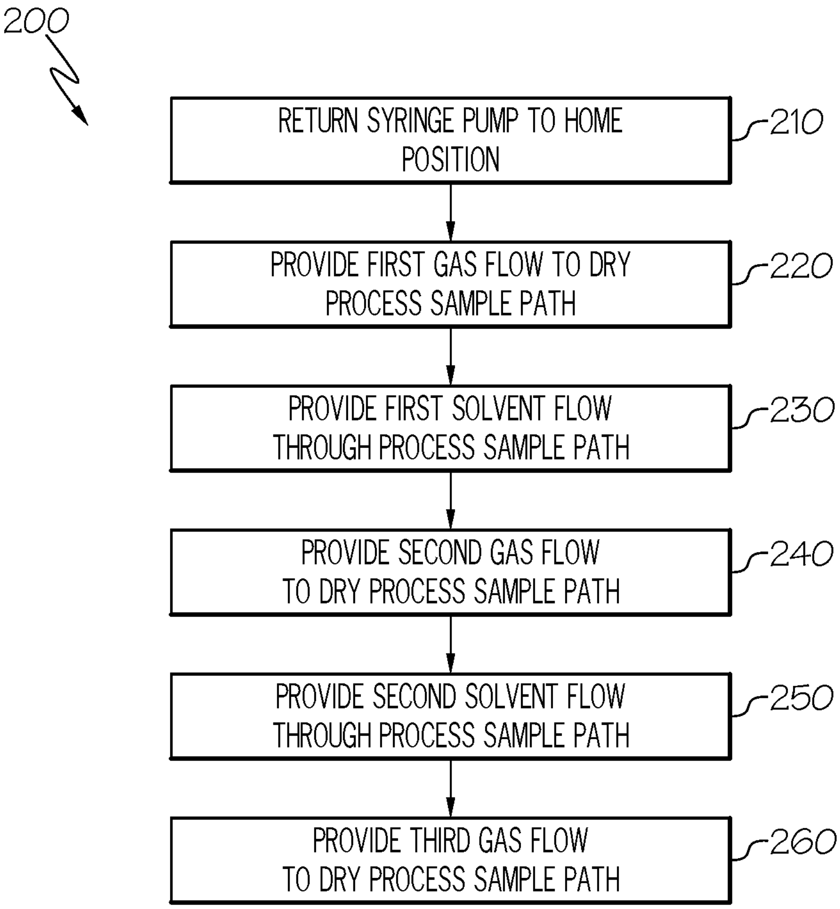
FIG. 14 is a flowchart representation of an example of a method for preparing the process sample path of the fluidic network shown in FIGS. 2 to 12 to receive another process sample.

The fluidic network can now be readied for a subsequent process sample acquisition. Reference is also made here to the flowchart of FIG. 14 which depicts an example of a method 200 for preparing the process sample path of the fluidic network to receive the next process sample.

Figure 8:
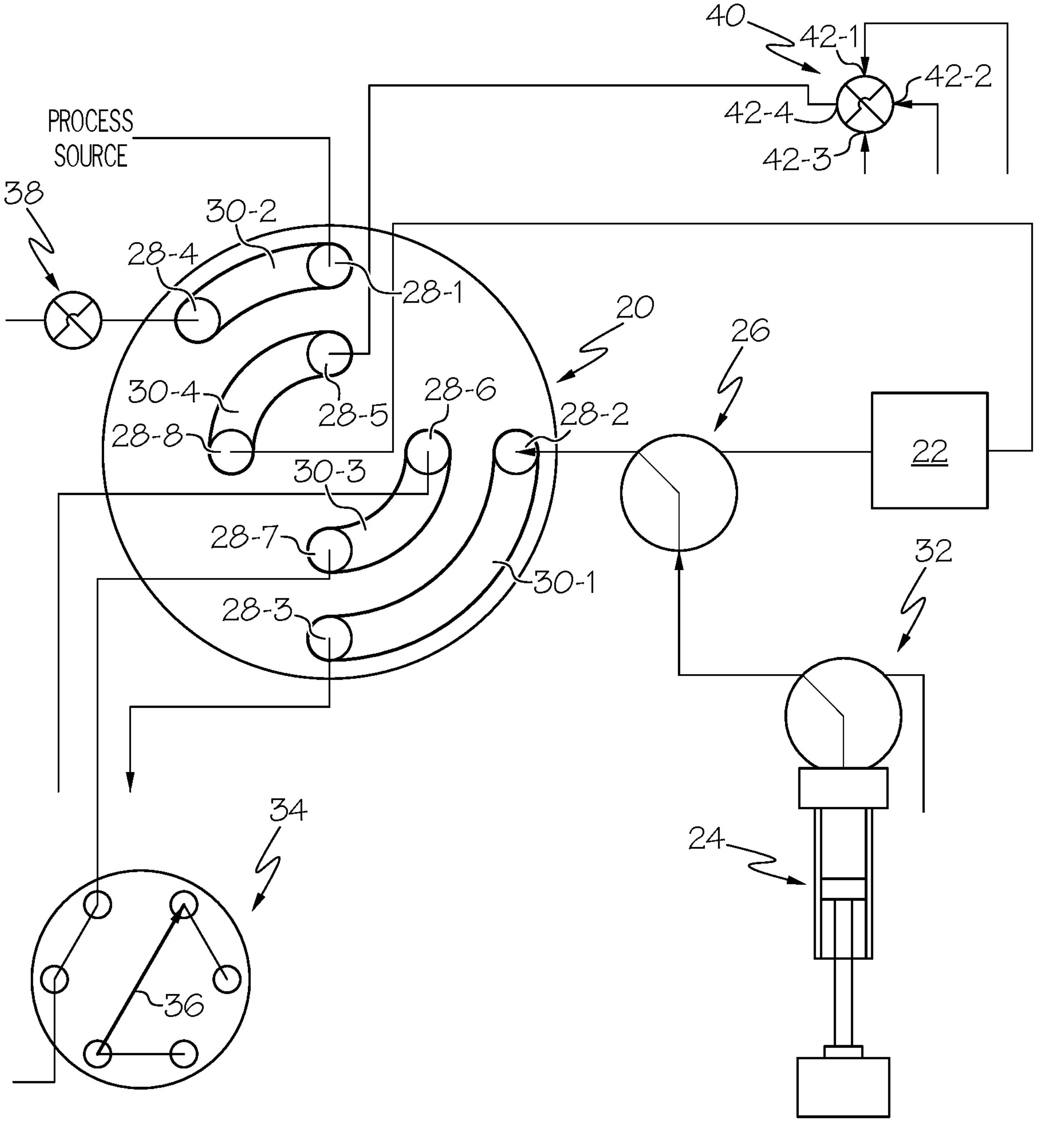
FIG. 8 shows the fluidic network of FIG. 7 with the selector valve switched back to its first valve state to allow a syringe pump to return to its home position.
Figure 9:
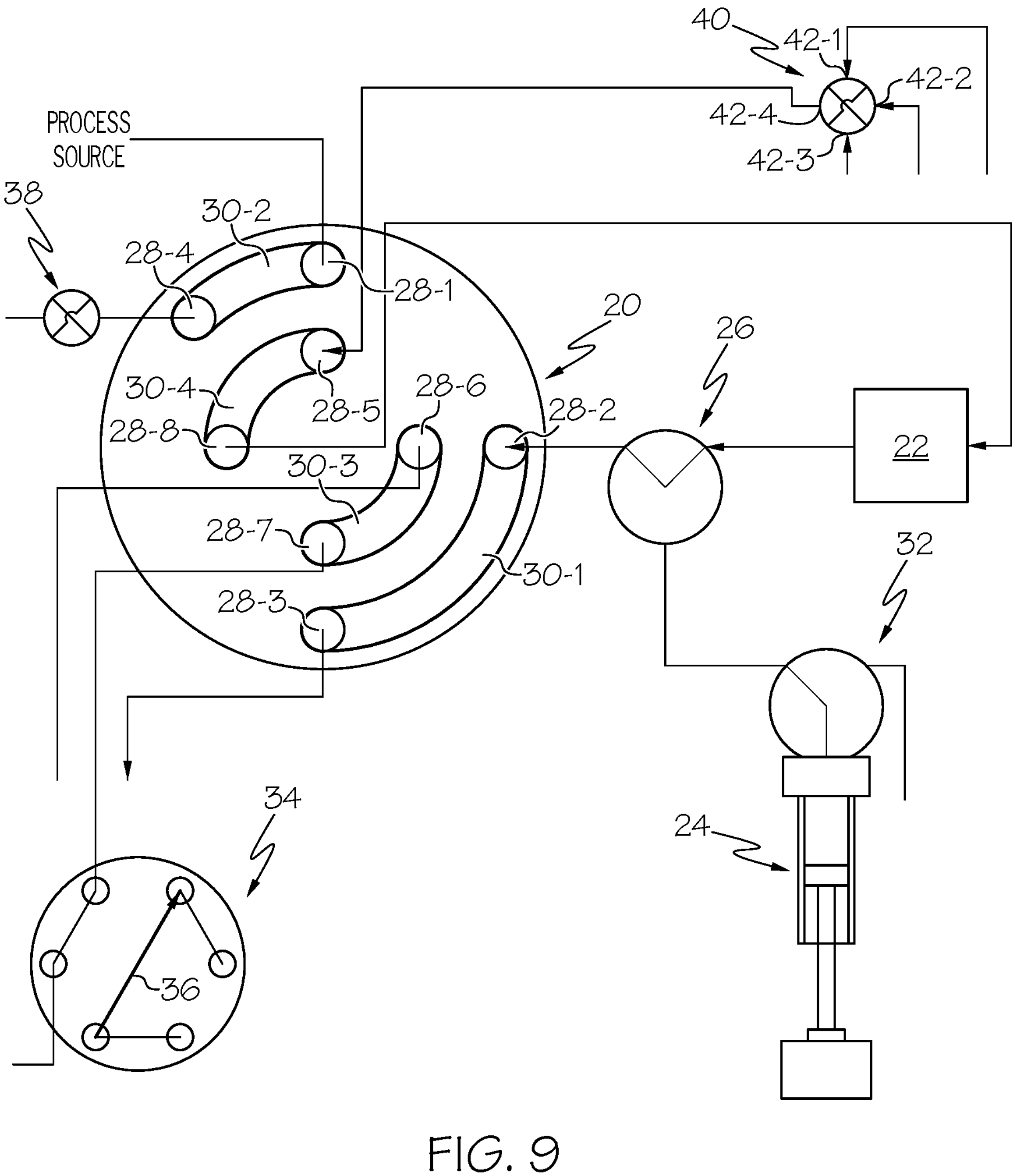
FIG. 9 shows the fluidic network of FIG. 8 with the selector valve switched to its second state with a manifold valve in its first valve state to provide a gas flow through the process sample path.
Figure 10:
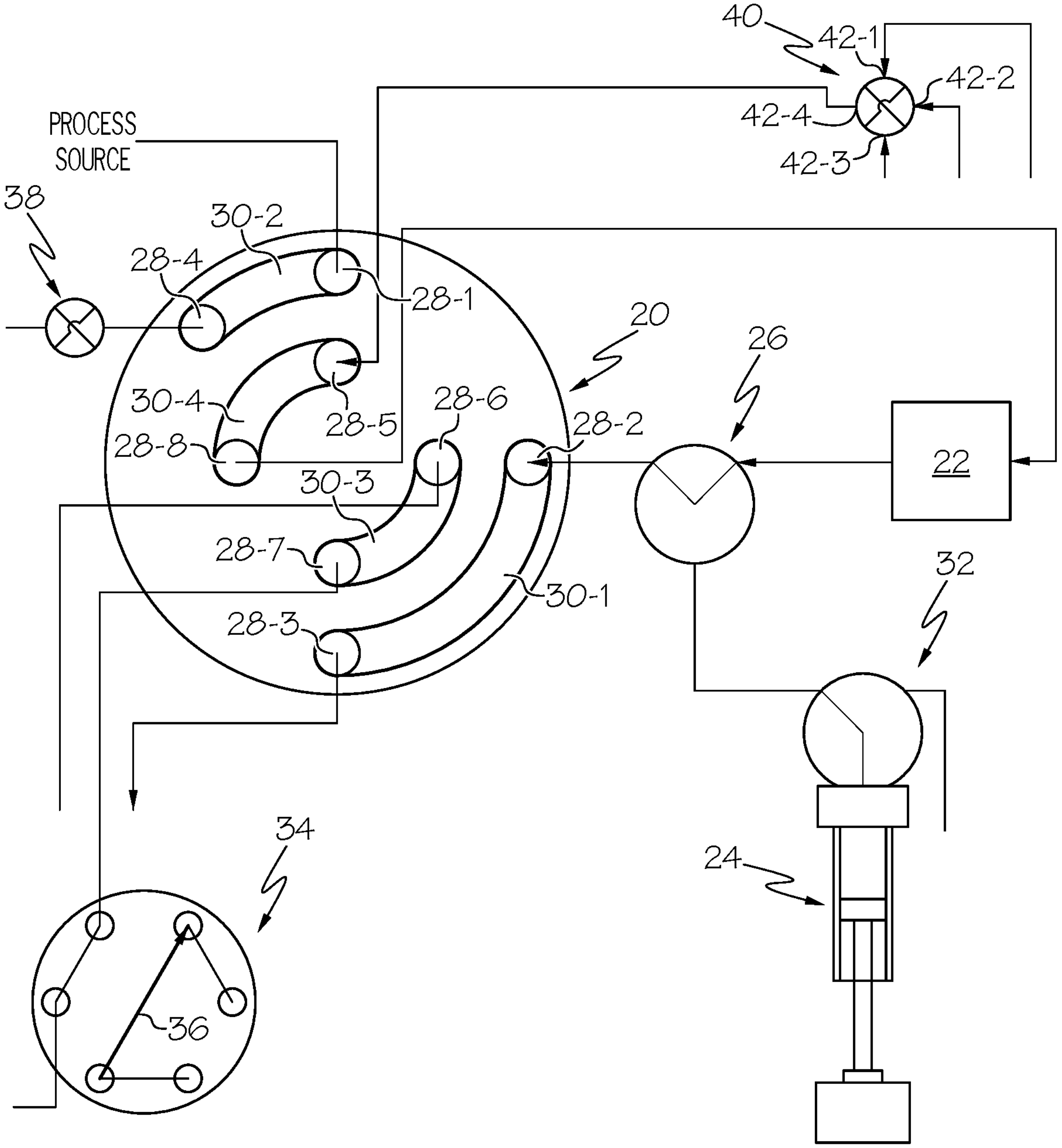
FIG. 10 shows the fluidic network of FIG. 9 with the manifold valve switched to its second valve state to provide a first solvent through the process sample path.

In FIG. 8, the selector valve 26 is shown switched back to its first valve state. This configuration allows liquid in the fluidic channel between the syringe pump 24 and stator port 28-2 to be pushed through valve channel 30-1 and stator port 28-3 to waste until the syringe pump 24 returns (step 210) to its home position. Subsequently, the selector valve 26 is switched to its second state as shown in FIG. 9. This establishes a continuous fluidic path that includes the process sample path. More specifically, the continuous fluidic path extends from the manifold valve 40 through valve channels 30-4, sample treatment module 22 and valve channel 30-1 to waste. The manifold valve 40 is in its first valve state so that a gas flow at the first inlet port 42-1 flows, in reverse direction, through the process sample path. The gas flow is used to dry (step 220) the process sample path, including the valve channels 30-1 and 30-4 and the sample treatment module 22. By way of non-limiting examples, the gas may be nitrogen or another non-reactive gas or may be oxygen. Next, the manifold valve 40 is switched to its second valve state, as shown in FIG. 10, where a strong wash solvent flows (step 230) in reverse direction through the process sample path to waste. A strong solvent, as used herein, means a solvent that generally is capable of dissolving and removing anything remaining in the sample flow path. The strong solvent may be disruptive to a process sample. Examples of a strong solvent that may be used are a detergent or a liquid that may lyse and destroy cells within the process sample path and dissolve and carry away the cell membrane materials in the flow to waste. The manifold valve is switched back to its first state (FIG. 9) to dry (step 240) the process sample path before switching to its third valve state, as shown in FIG. 11, where a weak solvent flows (step 250) in a reverse direction through the process sample path to waste. The weak solvent may remove any of the strong solvent that remains in the process sample path that might otherwise pose a risk for the next process sample acquisition. For example, the weak solvent may be a phosphate-buffered saline (PBS) solution, a cell culture medium or other another liquid in which cellular material may be maintained in suspension and readily transported in a flow of the liquid. The manifold valve 40 is again switched back to its first state (FIG. 9) to perform the final drying (step 260) of the process sample path. Referring to FIG. 12, the fluidic network is then made ready for the next sample acquisition by switching the sampling valve 20 to its first valve state and switching the metering pump 26 to its first valve state.

The durations when the gas and solvents pass through the process sample path may be controlled and may be different from each other. Moreover, the gas and solvent flow rates may be different. In alternative examples of preparing the sample path to receive the next process sample, the sequence of the gas and solvent flows may be different. For example, step 240 may be omitted such that the weaker solvent may be used to displace the stronger solvent from the process sample path without any intervening gas flow.

While various examples have been shown and described, the description is intended to be exemplary, rather than limiting and it should be understood by those of ordinary skill in the art that various changes in form and detail may be made therein without departing from the scope of the invention as recited in the accompanying claims. For example, although the sampling valve 20 shown in the figures and described above includes a stator port 28-4 and valve channel 30-2, these features may be omitted in a sampling valve for a fluidic network that does not push process sample drawn from a process source back toward the process source while still providing the other features associated with the fluidic network. In another example, the process sample path described above includes two valve channels and a sample preparation module. It should be recognized that in other embodiments the number of valve channels defining the process sample path may be different and there may be additional or alternative components present in the portion of the process sample path that exists external to the sampling valve.

What is claimed is:

1. A fluidic network for aseptic process sampling, comprising:

a sampling valve configurable in at least a first sampling valve state and a second sampling valve state and including a process inlet port to receive a process sample, a process outlet port to provide the process sample, and a plurality of valve channels, a sample treatment module comprising a filtration element and a sample preparation element in fluidic communication with each other;

a positive displacement pump;

a selector valve disposed in a fluidic path between and in fluidic communication with the sampling valve and the sample treatment module, the selector valve being in further fluidic communication with the positive displacement pump, the selector valve being configurable in a first selector valve state in which the sampling valve is fluidically coupled to the positive displacement pump, a second selector valve state in which the positive displacement pump is fluidically coupled to the sample treatment module and a third selector valve state in which the sampling valve is fluidically coupled to the sample treatment module; and a valve control module in communication with the sampling valve and the selector valve and configured to control the valve states thereof, wherein, a process sample path is defined between the process inlet port and the process outlet port and includes the sample treatment module and at least one valve channel of the sampling valve, wherein, when the sampling valve is in the first sampling valve state and the selector valve is in the first selector valve state, a section of the process sample path receives the process sample by a draw operation of the positive displacement pump, and wherein, when the sampling valve is in the first sampling valve state and the selector valve is in the second selector valve state, at least a portion of the process sample received in the section of the process sample path is pushed through the sample treatment module by operation of the positive displacement pump.

2. The fluidic network of claim 1 further comprising an injection valve in fluidic communication with the process outlet port of the sampling valve.

3. The fluidic network of claim 1 wherein the positive displacement pump is a syringe pump.

4. The fluidic network of claim 1 further comprising a metering valve fluidically coupled to the positive displacement pump, wherein the selector valve is in fluidic communication with the sampling valve, the sample treatment module and the metering valve, the selector valve being configurable in a first valve state in which the sampling valve is fluidically coupled to the metering valve, a second valve state in which the first metering valve is fluidically coupled to the sample treatment module and a third valve state in which the sampling valve is fluidically coupled to the sample treatment module.

5. The fluidic network of claim 1 wherein the sample preparation element is one of an affinity purification element, a size exclusion element and an ion exchange element.

6. The fluidic network of claim 1 wherein the filtration element comprises one of a membrane, a syringe filter and a frit.

7. The fluidic network of claim 1, wherein the sampling valve further includes a gas inlet port and wherein, when the sampling valve is in the second sampling valve state, the gas inlet port is in fluidic communication with the process inlet port through one of the valve channels to conduct a gas flow received at the gas inlet port into a fluidic path between the process inlet port and a process source.

8. The fluidic network of claim 7 further comprising a gas valve in fluidic communication with the gas inlet port and a gas source, the gas valve configured to control a gas flow to the gas inlet port.

9. The fluidic network of claim 1, wherein the sampling valve further includes a backflush inlet port, the fluidic network further comprising a multi-port valve configured to selectively control the flows of a plurality of fluids, the multi-port valve having an outlet port in fluidic communication with the backflush inlet port to provide a flow of a selected one of the fluids.

10. The fluidic network of claim 9, wherein the multi-port valve has a first inlet port configured to receive a gas flow, a second inlet port configured to receive a first solvent flow, and the outlet port in fluidic communication with the backflush inlet port of the sampling valve, the multi-port valve being configurable in a first multi-port valve state in which the backflush gas flow is conducted from the first inlet port to the outlet port, a second multi-port valve state in which the first solvent flow is conducted from the second inlet port to the outlet port, and a closed valve state in which the first and second inlet ports are fluidically decoupled from the outlet port.

11. The fluidic network of claim 10 wherein the multi-port valve has a third inlet port configured to receive a second solvent flow, the multi-port valve being configurable in a third multi-port valve state in which the second solvent flow is conducted from the third inlet port to the outlet port.

12. The fluidic network of claim 10 wherein, when the sampling valve is in the second sampling valve state and the selector valve is in the third selector valve state, a fluidic path is formed from the multi-port valve through the backflush inlet port of the sampling valve, the sample treatment module, the selector valve, and the at least one of the valve channels of the process sample path.

13. The fluidic network of claim 12, wherein, when the multi-port valve is in one of the first and second multi-port valve states, the gas flow or the first solvent flow, respectively, flows through the sample treatment module in a reverse flow direction.

14. The fluidic network of claim 1, wherein the filtration element and the sample preparation element are integrated in a single housing.

15. The fluidic network of claim 1 further comprising:

a solvent selector valve having a network port and a plurality of solvent ports and being in fluidic communication with the positive displacement pump through the network port; and a plurality of solvent sources each in fluidic communication with a respective one of the solvent ports, wherein the solvent selector valve is configurable in a plurality of valve states each fluidically coupling one of the solvent sources to the positive displacement pump through the network port.

16. A method for aseptic process sampling, the method comprising:

providing a fluidic network for aseptic process sampling including:

a sampling valve configurable in at least a first sampling valve state and a second sampling valve state and including a process inlet port to receive a process sample, a process outlet port to provide the process sample, and a plurality of valve channels, a sample treatment module comprising a filtration element and a sample preparation element in fluidic communication with each other;

a positive displacement pump;

a selector valve disposed in a fluidic path between and in fluidic communication with the sampling valve and the sample treatment module, the selector valve being in further fluidic communication with the positive displacement pump, the selector valve being configurable in a first selector valve state in which the sampling valve is fluidically coupled to the positive displacement pump, a second selector valve state in which the positive displacement pump is fluidically coupled to the sample treatment module and a third selector valve state in which the sampling valve is fluidically coupled to the sample treatment module; and a valve control module in communication with the sampling valve and the selector valve and configured to control the valve states thereof, wherein, a process sample path is defined between the process inlet port and the process outlet port and includes the sample treatment module and at least one valve channel of the sampling valve, wherein, when the sampling valve is in the first sampling valve state and the selector valve is in the first selector valve state, a section of the process sample path receives the process sample by a draw operation of the positive displacement pump, and wherein, when the sampling valve is in the first sampling valve state and the selector valve is in the second selector valve state, at least a portion of the process sample received in the section of the process sample path is pushed through the sample treatment module by operation of the positive displacement pump;

drawing the process sample from a process source into the process sample path;

pushing at least a portion of the process sample drawn into the process sample path in a forward direction through the sample treatment module to an injection valve; and pushing the portion of the process sample back toward the process source.

17. The method of claim 16 further comprising loading at least a portion of the process sample that was pushed to the injection valve into a sample loop.

18. The method of claim 16 wherein the sample treatment module is a single housing containing the filtration element and the sample preparation element.

19. The method of claim 16 wherein the sample preparation element comprises one of an affinity purification element, a size exclusion element and an ion exchange element.

20. The method of claim 16 further comprising providing at least one of a solvent flow and a gas flow in a reverse direction through the sample treatment module.

21. The method of claim 20 further comprising providing a flow of an elution buffer in a forward direction through the sample preparation element to thereby elute a compound of interest.

22. The method of claim 21 further comprising providing a flow of a regeneration buffer through the sample preparation element.

23. The method of claim 16 wherein the process source is a bioreactor.

* * * * *